INVENTOR.
WILL H. GRIMES

BY

ATTORNEYS

INVENTOR.
WILL H. GRIMES
BY
*Head & Johnson*
ATTORNEYS 3,195,247
BRUSH RAKE COMPRISING A PLURALITY OF GROUND ENGAGING RUNNERS WITH A TRAVERSE BLADE SECURED TO THE FRONT SURFACE THEREOF
Will H. Grimes, Box 790, Stamford, Tex.
Filed Nov. 15, 1962, Ser. No. 237,887
1 Claim. (Cl. 37—2)

This invention relates to a rake for a tractor. More particularly, the invention relates to a brush rake for use on a tractor for clearing land of brush and other undesirable non-grass vegetation.

In many parts of the southwestern United States a great amount of the potentially usable farm area is covered with brush and small trees, especially mesquite trees. This brush and the trees grow so dense that use of the land for commercial purposes is practically prohibited. The brush and trees shade the ground and rob it of its moisture, preventing grass from growing and the thickness of the growth makes it extremely difficult to find and drive cattle on the land.

For these reasons, attempts have been made to find means of effectively and economically removing such brush. One means which has been used is called "chaining" and is accomplished by dragging over land to be cleared a very heavy chain between two large tractors. The chain pulls over and breaks up much of the brush but unfortunately most of the smaller brush is left, and even the brush which is broken over remains in place, still making it difficult to use mechanical means of transportation over the land. Others have attempted to remove the brush by what is termed "root plows," that is, plows which penetrate below the surface of the earth to break off the trees and brush beneath the surface of the earth. Such systems work satisfactorily except for two disadvantages. First, this method is relatively expensive since moving implements under the surface of the earth requires a great amount of energy. Second, this system tears up the ground, disturbing and killing a high percentage of grass growing on the ground so that after the land is cleared it is substantially barren of grass.

In order to overcome the disadvantages of these two most frequently used systems of clearing land of brush and small trees, others have attempted to utilize bulldozer blades affixed to the front of tractors to push the trees and brush into large mounds which, after they have dried, can be burned. This system also has achieved some success but a problem exists in that in order to effectively remove the brush the blade must be in substantial contact with the earth, and when such contact is attained the blade tends to dig into the earth, removing grass and moving a great amount of dirt along with the brush so that the piles of brush contain large quantities of dirt which practically prevent the piles from being completely burned, leaving a mound of dirt and unburned brush to interfere with use of the land.

In order to overcome the disadvantages of these known attempts to clear land of brush, this invention provides a rake adaptable for mounting on the front of a tractor which overcomes the disadvantages of all the other known methods of brush removal. The rake of this invention removes both large and small brush and cleans the land effectively so that after the land has been cleared regular farm tractors, "Jeeps" and other mechanical means of transportation may be driven over the land. The brush rake of this invention is effective to remove substantially all of the brush but in a means which does not carry with the accumulated brush any substantial amounts of dirt. By the use of the rake of this invention the brush may be gathered and piled in large piles. The brush piles are substantially dirt free and can be effectively burned without leaving any mounds to interfere with the use of land. Another important advantage of the brush rake of this invention is that the grass and top soil remain substantially undisturbed as the brush and trees are removed so that a good growth of grass exists after the brush is removed.

In addition to the object of producing a rake having the foregoing advantages over known methods of land clearing, another important object of the invention is to provide a rake having a bumper member extending in advance of the rake to push over and place into position for uprooting and breaking off larger trees and brush, so that the rake is more effective and efficient in removing these larger trees and brush at the ground level.

Another object of this invention is to provide a bumper member as an element of a brush rake which is effective in packing and containing brush accumulated in front of the rake so that larger quantities of the brush may be accumulated, greatly improving the efficiency of the rake.

These and other objects and a better understanding of the invention may be had by referring to the following description and claim, taken in conjunction with the attached drawings in which:

This invention relates to a rake for use in clearing land of brush and small trees. More particularly, but not by way of limitation, this invention may be described as a rake for clearing land of brush and the like, said rake mountable on the front of a tractor, comprising, in combination, an upstanding back frame portion having a width at least the width of said tractor, a multiplicity of teeth members affixed at one end to said back portion and extending downwardly and forwardly of said back portion, substantially flat runner members affixed to the bottom end of each of said teeth, a bar member positioned transversely of and affixed to said teeth at a spaced relationship above said runner members, means of pivotally supporting said back frame portion to and forwardly of said tractor, and means on said tractor of pivotally raising and lowering said rake relative to said tractor.

Figure 1:
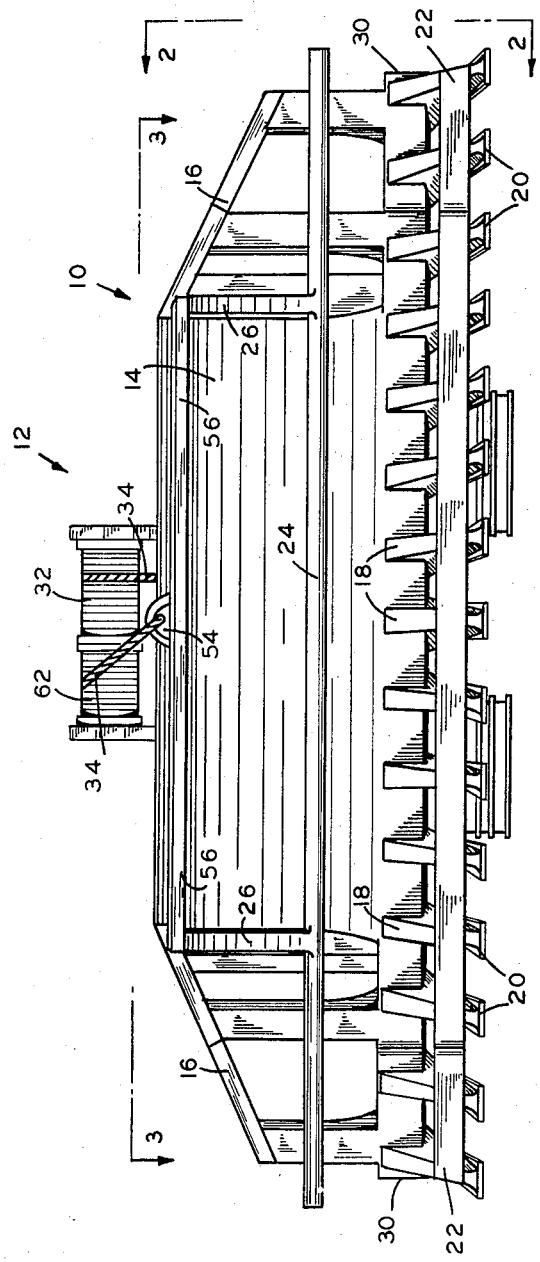
FIGURE 1 is a front elevational view of the rake of this invention affixed to a crawler type tractor, with the rake shown in a raised position.
Figure 3:
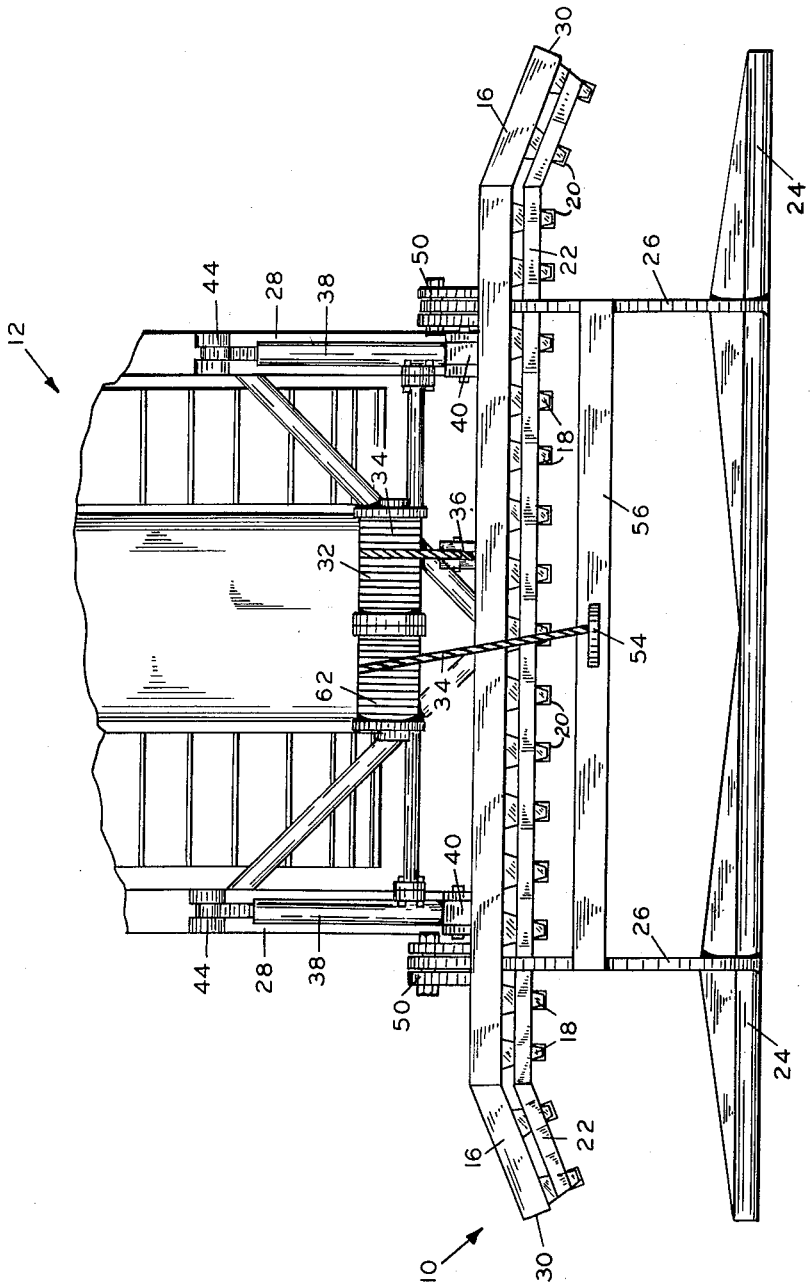
FIGURE 3 is a top view of the rake of this invention affixed to a tractor.

Referring now to the drawings and first to FIGURE 1, the rake of this invention is indicated generally by the numeral 10 and is shown as positioned and supported on the front of a crawler type tractor 12. The tractor being almost completely hidden from view by the rake. Typically, the rake is approximately twenty feet wide when used on a size of tractor such as a caterpillar, D8. The rake includes a substantially vertical back frame portion 14 which is supported in a plane substantially perpendicular to the length of tractor 12. The back frame portion 14 forms in essence the basic frame of the rake on which the other elements are supported. Wing portions 16, which serve the same function as back portion 14 and are extensions thereof, extend at an angle relative to the back portion 14 (see FIGURE 3). Affixed to and depending from the lower extremity of the back frame portion 14 are a multiplicity of spaced teeth 18, which, when the rake is in operation, engage the ground being cleared. The lower edges of teeth 18 are preferably provided with flat runners 20. A flat bar 22 extends across the front lower portion of teeth 18 approximately two and one-half to three inches above runners 20. Supported in front of rake 10, and forming a part thereof, is a bumper bar 24 which is pivotally supported in place with arms 26.

Figure 2:
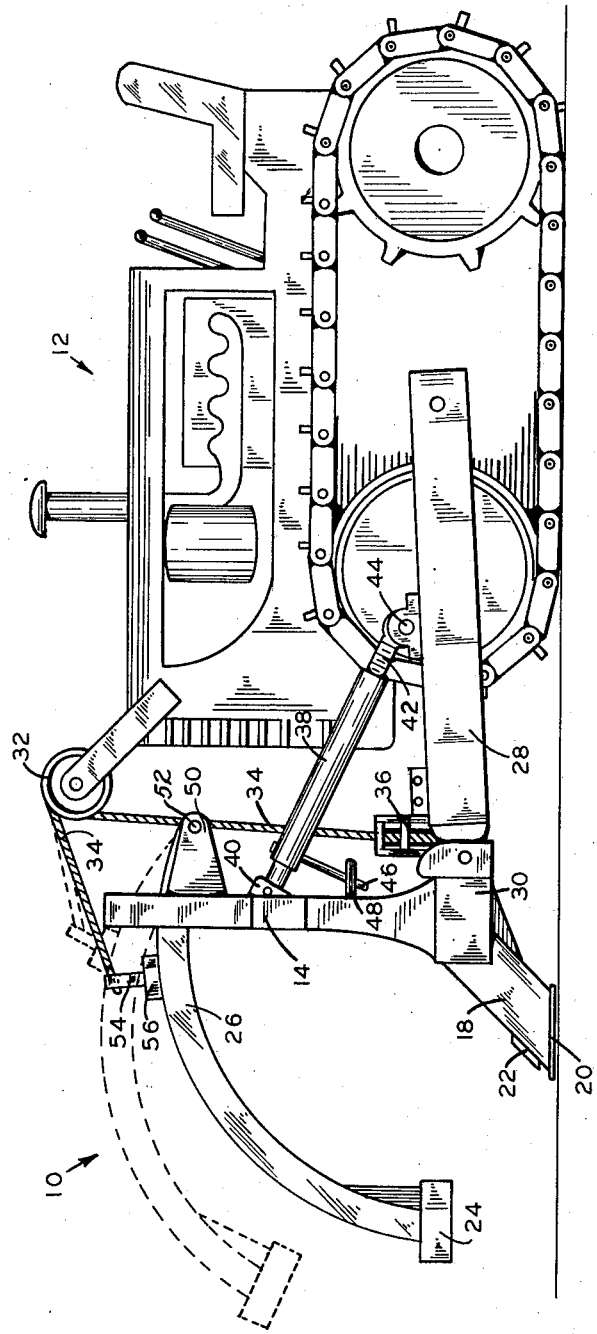
FIGURE 2 is a side view of the rake of this invention affixed to a tractor as shown in the lowered position as in use.

Referring now to FIGURE 2, more details of the construction of the rake 10 can be seen. The rake is preferably supported on a tractor 12 by the use of push arms 28 in substantially the same manner in which a dozer blade is typically supported. Push arms 28 are attached to framework 30 which is the lower extremity of back frame portion 14.

To facilitate controlling the elevation of the rake 10 relative to the tractor, a winch 32 affixed to the tractor controllably winds and unwinds cables 34 which extend down to pulley 36. The operator of the tractor 12, by control of winch 32 can adjustably raise and lower the rake when necessary.

To control the pitch or displacement relative to the vertical of back frame portion 14, an internally threaded cylinder 38 is provided. Cylinder 38 is pivoted at point 40 at one end thereof to the back frame portion 14 of the rake. An externally threaded rod 42 is threadably received by the cylinder 38. Rod 42 is pivotally connected to push arm 28 at pivot point 44. The point 40 permits the rotation of cylinder 38 so that the angular position of rake 10 is easily adjusted by the rotation of cylinder 38 to threadably receive or extract more or less of the length of rod 42. A slideable pin 46 is provided by means of which cylinder 38 is rotated and, to prevent accidental rotation of cylinder 38, a keeper 48 receives pin 46 when it is not in use for adjusting the angle of the rake.

Bumper bar 24, held in position in advance of the rake by arms 26, is pivotally supported on the rake 10 by bracket 50. Arms 26 pivot at pivot points 52. By means of a lifting bracket 54 affixed to lifting rod 56 extending between the bumper bar arms 26, the bumper bar 24 may be raised or lowered for purposes which will be described subsequently.

*Operation*

When ground is to be cleared with the rake of this invention the rake 10 is lowered so that runners 20 slide along on top of the ground. If the ground is wet and soft the operator of the tractor 12 may apply sufficient tension to cables 34 to maintain runners 20 in engagement with the earth but prohibit the runners from plowing beneath the earth to disturb the grass. When the ground is dry and firm, the weight of the rake is readily supported by runners 20. Runners 20, being flat surfaces, bear the weight of the rake and scoot along the surface of the earth without digging into it, thus leaving the grass growing on the earth and not disturbing it as occurs with other of the known types of means of brush removal.

Any brush which is encountered is engaged by bar 22 positioned on the front of teeth 18 with the lower edge thereof two and one-half or three inches above the runners 20. This distance is sufficient to pass over any grass but to engage and uproot and carry before it any brush, trees or so forth which must be cleared from the land. The vacant space above bar 22 and between teeth 18 permits any dirt which may be accumulated by the uprooting of brush and trees to pass through and therefore not be gathered in the accumulation of brush and trees as the rake passes over the surface of the earth.

The back frame portion 14 is preferably covered in the center portion by a solid sheet in front of the tractor 12 as shown in FIGURE 1 to protect the radiator and other portions of the tractor from being damaged by accumulated brush and trees.

Bumper bar 24, protruding in front of the rake 10, engages the trunks of larger brush and trees and bends them forward so that the trees are under tension when they are engaged by teeth 18 or bar 22. In this manner the larger brush and trees are much more easily uprooted or broken then if bumper bar 24 was not present.

The bumper bar 24 with arms 26 forms an additional and important service of helping to pack and accumulate uprooted brush and trees in front of the rake so that a larger quantity of material may be moved with one sweep of the rake. The pivotal arrangement of arms 26 permits the arms 26 and bumper bar 24 to raise automatically as a quantity of brush and trees accumulates. The weight of the bumper bar 24 maintains sufficient downward pressure to hold the accumulated brush and trees into a compact form so that they will not dribble out the side of the rake.

After a rake full of trees and brush has been attained as the rake is moved over the earth, the uprooted material is preferably placed in large piles or rows. When the destination for the pile or row is reached, the operator backs the tractor away. When backing away, the pivot arrangement of arms 26 allows the bumper bar 24 to move upward so that the accumulated brush is released. If necessary, the operator, by controlling pulley 62, can raise or lower the bumper bar 24.

The invention provides a new and novel type of brush rake for clearing land of brush and small trees which functions much more effectively and efficiently than any other device known. The rake provides a means of removing brush and trees from land without disturbing the grass growing on the land and without accumulating large quantities of dirt in the piles of removed brush and trees.

Although the invention has been described with a certain degree of particularity, it is manifested that many changes may be made in the details of construction and the arrangement of components without departing from the spirit and scope of this disclosure.

What is claimed:

In combination with a tractor a rake mounted on the front of said tractor for clearing land of brush and the like, comprising:
    an upstanding back frame portion having a width at least the width of said tractor;
    a multiplicity of teeth members affixed at one end to said back frame portion and extending downwardly and forwardly of said back portion;
    a runner member having a flat ground engaging lower surface affixed to the bottom end of each of said teeth;
    a unitary transversely positioned flat bar member extending the width of said multiplicity of teeth and supported to the forward surface of said teeth and having the lower edge thereof spaced above said runner members and the upper edge thereof below the said back frame portion;
    means of pivotally supporting said back frame portion to and forwardly of said tractor; and
    means on said tractor of pivotally raising and lowering said rake relative to said tractor.

References Cited by the Examiner

UNITED STATES PATENTS

| | | |
|---|---|---|
| 2,173,406 | 9/39 | Wilkinson. |
| 2,716,823 | 9/55 | Mullin. |
| 2,735,197 | 2/56 | Struemph. |
| 3,021,619 | 2/62 | McGee. |

BENJAMIN HERSH, *Primary Examiner.*

CHARLES E. O'CONNELL, *Examiner.*